(12) United States Patent
Jung et al.

(10) Patent No.: US 7,547,362 B2
(45) Date of Patent: Jun. 16, 2009

(54) DISPENSER FOR LIQUID CRYSTAL DISPLAY PANEL AND METHOD FOR CONTROLLING GAP BETWEEN SUBSTRATE AND NOZZLE USING THE SAME

(75) Inventors: Sung-Su Jung, Daegu (KR); Yong-Keun Kwak, Gangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 764 days.

(21) Appl. No.: 10/726,584

(22) Filed: Dec. 4, 2003

(65) Prior Publication Data
US 2004/0131758 A1   Jul. 8, 2004

(30) Foreign Application Priority Data
Dec. 18, 2002   (KR) ............... 10-2002-0081439

(51) Int. Cl.
*B05C 11/10* (2006.01)
(52) U.S. Cl. ............... 118/669; 118/679; 118/680; 118/681; 118/713
(58) Field of Classification Search ........... 118/669, 118/681, 713, 679, 680, 712
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |

(Continued)

FOREIGN PATENT DOCUMENTS

EP   1 003 066   5/2000

(Continued)

OTHER PUBLICATIONS

Advanced Micro Systems, Inc., "Stepper Motor System Basics", Aug. 7, 2000, pp. 1-9.*

*Primary Examiner*—George R Koch, III
(74) *Attorney, Agent, or Firm*—McKenna Long & Aldridge LLP (57) ABSTRACT

A dispenser for a liquid crystal display panel includes a syringe having a nozzle provided at an end thereof, a body in which the syringe is mounted, a vertical driving stepping motor for moving the body in a vertical direction, a first sensor for detecting whether the nozzle of the syringe is in contact with a substrate, a second sensor for detecting a gap distance between the nozzle and the substrate, and a main unit for controlling the vertical driving stepping motor in response to an output from the second sensor to obtain a desired gap distance between the nozzle and the substrate.

8 Claims, 8 Drawing Sheets

U.S. PATENT DOCUMENTS

| | | | |
|---|---|---|---|
| 5,680,189 | A | 10/1997 | Shimizu et al. |
| 5,742,370 | A | 4/1998 | Kim et al. |
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 6,819,392 | B2 | 11/2004 | Murata et al. |
| 2001/0021000 | A1 | 9/2001 | Egami |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 57-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-252622 | 10/1988 |
| JP | 63-311233 | 12/1988 |
| JP | 02-198417 | 8/1990 |
| JP | 05-015819 | 1/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 05-345160 | 12/1993 |
| JP | 6-51256 | 2/1994 |
| JP | 06-114315 * | 4/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 08/229495 | 9/1996 |
| JP | 8-240807 | 9/1996 |
| JP | 9-5762 | 1/1997 |
| JP | 9-26578 | 1/1997 |
| JP | 9-61829 | 3/1997 |
| JP | 09-066252 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2003-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |

| | | |
|---|---|---|
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| JP | 2003-177411 | 6/2003 |
| JP | 2004-199076 | 7/2004 |
| KR | 2000-0035302 | 6/2000 |

\* cited by examiner

DISPENSER FOR LIQUID CRYSTAL DISPLAY PANEL AND METHOD FOR CONTROLLING GAP BETWEEN SUBSTRATE AND NOZZLE USING THE SAME

This application claims the benefit of the Korean Application No. P2002-081439 filed on Dec. 18, 2002, which is hereby incorporated by reference.

BACKGROUND OF THE INVENTION

1. Field of the Invention

The present invention relates to a dispenser for a liquid crystal display panel and a method for controlling a gap distance between a nozzle and a substrate when using the dispenser, and more particularly, to a dispenser for a liquid crystal display panel and a method for controlling a gap distance between a nozzle and a substrate when using the dispenser to control a gap distance between the substrate, where a liquid crystal display panel is formed, and the nozzle.

2. Discussion of the Related Art

In general, a liquid crystal display device is a display device where data signals according to picture information are individually supplied to liquid crystal cells arranged in a matrix form. Light transmittance of the liquid crystal cells is controlled in accordance with the data signals to display a desired picture. The liquid crystal display device includes a liquid crystal display panel where the liquid crystal cells are arranged in a matrix form, and a driver integrated circuit (IC) for driving the liquid crystal cells. The liquid crystal display panel includes a color filter substrate and a thin film transistor array substrate attached to each other. The liquid crystal display panel further includes a liquid crystal layer between the color filter substrate and the thin film transistor array substrate.

Data lines and gate lines are formed on the thin film transistor array substrate of the liquid crystal display panel and cross each other at right angles so as to define liquid crystal cells. The data lines transmit a data signal supplied from the data driver integrated circuit to the liquid crystal cells. The gate lines transmit a scan signal supplied from the gate driver integrated circuit to the liquid crystal cells. At an end portion of each of the data lines and the gate lines, a data pad and a gate pad are respectively provided in which data signals and scan signals are respectively applied from the data driver integrated circuit and the gate driver integrated circuit. The gate driver integrated circuit sequentially supplies a scan signal to the gate lines so that the liquid crystal cells arranged in a matrix form can be sequentially selected line by line while a data signal is supplied to the selected line of the liquid crystal cells from the data driver integrated circuit.

A common electrode and a pixel electrode are respectively formed on the inner side of the color filter substrate and the thin film transistor array substrate for applying an electric field to the liquid crystal layer of a liquid crystal cell. More particularly, a pixel electrode is respectively formed in each liquid crystal cell on the thin film transistor array substrate, while the common electrode is integrally formed across the entire surface of the color filter substrate. Therefore, by controlling a voltage applied to the pixel electrode while a voltage is applied to the common electrode, light transmittance of the liquid crystal cells can be individually controlled. To control the voltage applied to the pixel electrode by liquid crystal cells, a thin film transistor is formed in each liquid crystal cell and used as a switching device.

Figure 1:
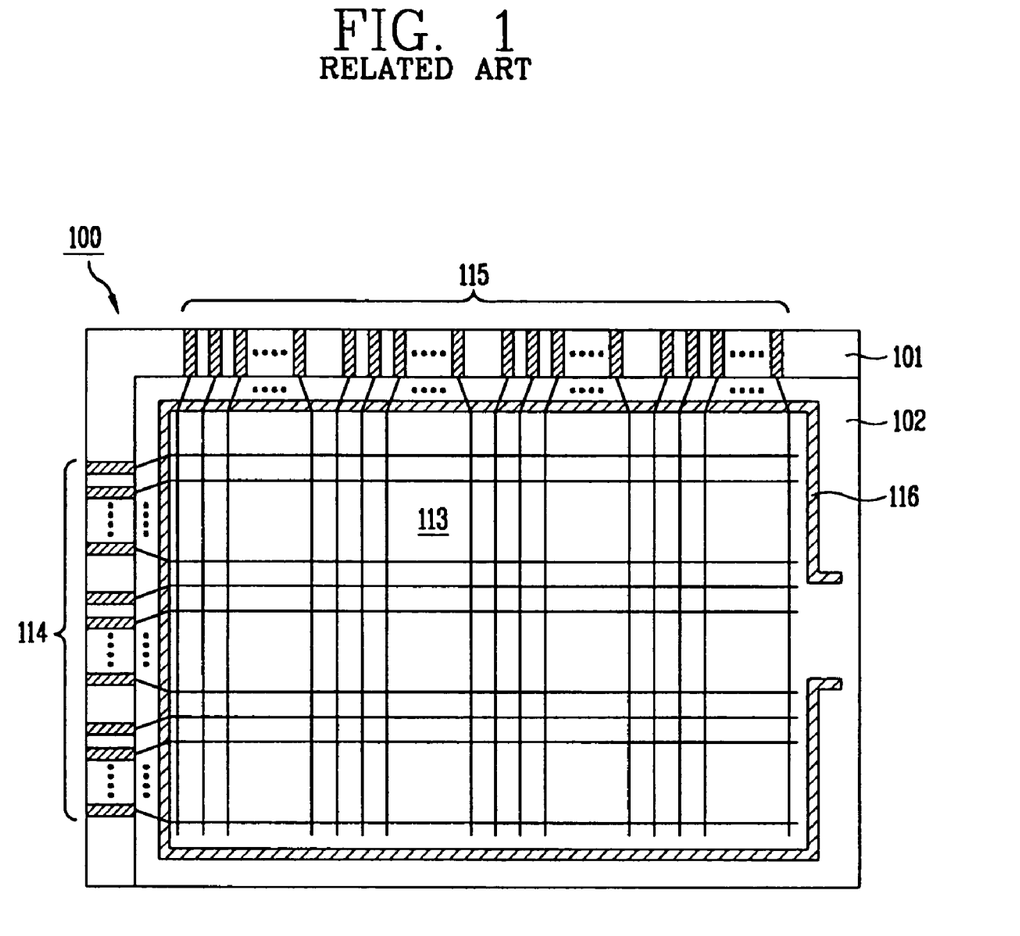
FIG. 1 is a plane view of the unit liquid crystal panel formed by attaching a thin film transistor array substrate and a color filter substrate according to the related art.

FIG. 1 is a plane view of the unit liquid crystal display panel formed by a thin film transistor array substrate and a color filter substrate according to the related art. As shown in FIG. 1, the liquid crystal display panel 100 includes an image display part 113 where the liquid crystal cells are arranged in a matrix form, a gate pad part 114 connected to the gate lines of the image display part 113, and a data pad part 115 connected to the data lines of the image display part 113. The gate pad part 114 and the data pad part 115 are formed along an edge region of the thin film transistor array substrate 101, which does not overlap with the color filter substrate 102. The gate pad part 114 supplies a scan signal from the gate driver integrated circuit to the gate lines of the image display part 113, and the data pad part 115 supplies image information from the data driver integrated circuit to the data lines of the image display part 113.

Data lines to which image information is applied and gate lines to which a scan signal is applied are provided on the thin film transistor array substrate 101. The data lines and the gate lines cross each other. Additionally, a thin film transistor for switching the liquid crystal cells is provided at each crossing of the data lines and the gate lines. A pixel electrode for driving the liquid crystal cells is connected to the thin film transistor and provided on the thin film transistor array substrate 101. A passivation film for protecting the pixel electrode and the thin film transistor is formed at the entire surface of the thin film transistor array substrate 101.

Color filters are provided on the color filter substrate 102 for each cell region. The color filters are separated by a black matrix. A common transparent electrode is also provided on the color filter substrate 102.

A cell gap is formed by a spacer between the thin film transistor array substrate 101 and the color filter substrate 102. A seal pattern 116 is formed along an outer edge of the image display part 113. The thin film transistor array substrate 101 and the color filter substrate 102 are attached by the seal pattern 116 to thereby form a unit liquid crystal display panel.

In fabricating the unit liquid crystal display panel, a method for simultaneously forming unit liquid crystal display panels on a large-scale mother substrate is generally used. Thus, a process is required for separating the unit liquid crystal display panels from the large-scale mother substrate. For example, a cutting process can be used on the mother substrate to separate the plurality of unit liquid crystal display panels formed thereon.

The seal pattern 116, as discussed above, has an opening. After the unit liquid crystal display panel is separated from the large-scale mother substrate, liquid crystal is injected through a liquid crystal injection opening to form a liquid crystal layer at the cell-gap, which separates the thin film transistor array substrate 101 and the color filter substrate 102. Then, the liquid crystal injection opening is sealed.

As mentioned above, the following steps are required to fabricate the unit liquid crystal display panel: the thin film transistor array substrate 101 and the color filter substrate 102 are separately fabricated on the first and second mother substrates, the first and second mother substrates are attached in such a manner that a uniform cell-gap is maintained therebetween, the attached first and second mother substrates are cut into unit panels, and then liquid crystal is injected to the cell-gap between the thin film transistor array substrate 101 and the color filter substrate 102. In particular, the process of forming the seal pattern 116 along an outer edge of the image display part 113 is required to attach the thin film transistor array substrate 101 and the color filter substrate 102. The related art process of forming a seal pattern will now be described.

Figure 2A:
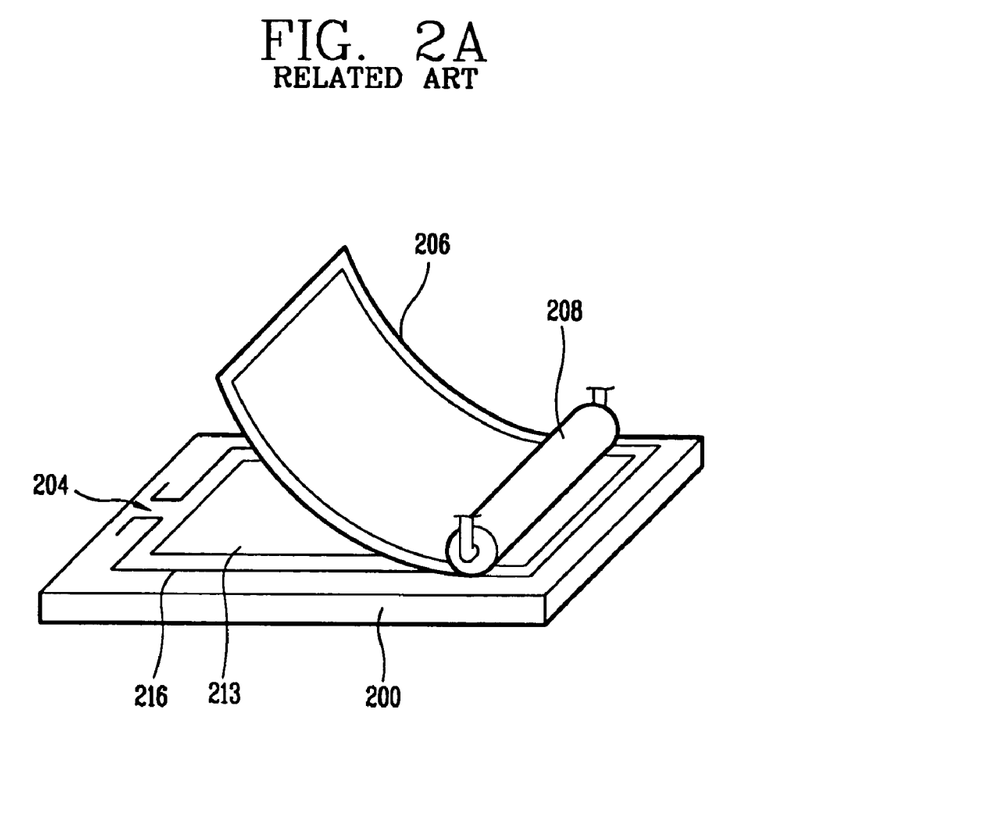
FIGS. 2A and 2B illustrate formation of a seal pattern through a screen printing method in accordance with the related art.
Figure 2B:
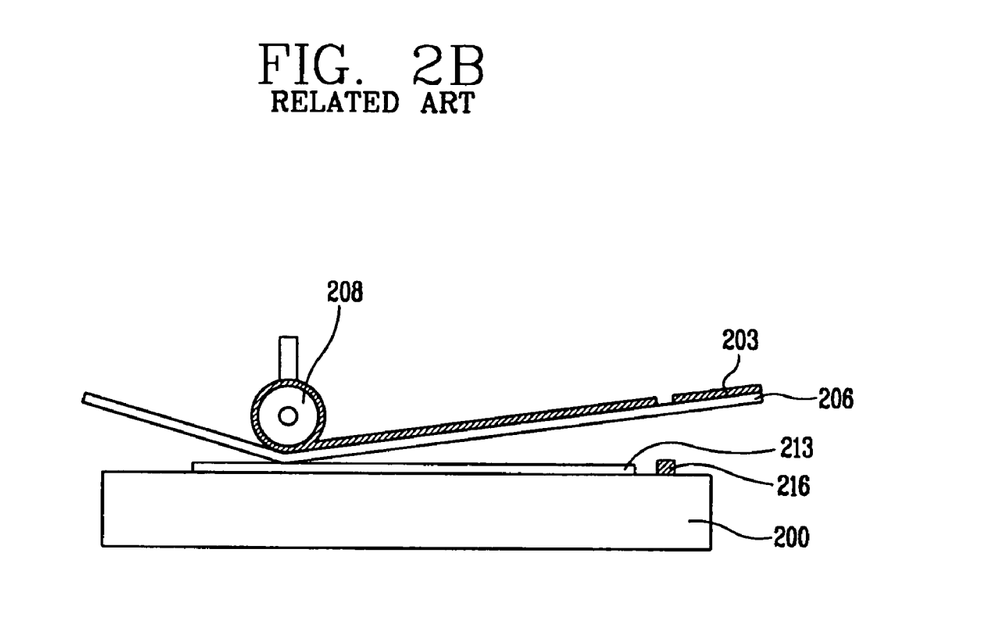

FIGS. 2A and 2B illustrate a screen printing method to form a seal pattern. As shown in FIGS. 2A and 2B, there is provided a screen mask 206 patterned so that a of seal pattern forming region is exposed. A rubber squeegee 208 is used to selectively supply a sealant 203 to the substrate 200 through the screen mask 206 so as to simultaneously form a seal pattern 216. The seal pattern 216 formed on the substrate 200 creates a gap in which liquid crystal layer is later injected and prevent leakage of the liquid crystal. Thus, the seal pattern 216 is formed along each outer edge of the image display part 213 of the substrate 200 and liquid crystal injection opening 204 is formed for the seal pattern 216.

The screen printing method includes: applying the sealant 203 on the screen mask 206 with the seal pattern forming region patterned thereon, forming the seal pattern 216 on the substrate 200 through printing with the rubber squeegee 208; and evaporating a solvent contained in the seal pattern 216 and leveling the pattern. The screen printing method is widely used because it is an easy process. However, the screen printing method is disadvantageous in that sealant 203 is wasted because a lot of sealant is discarded after the squeegee 208 is drawn across the screen mask to form the seal pattern 216. In addition, the screen printing method has a problem in that rubbing of an orientation film (not shown) formed on the substrate 200 can incur defects when the screen mask 206 and the substrate 200 come into contact with each other. These defects will degrade picture quality of the liquid crystal display device.

Figure 3:
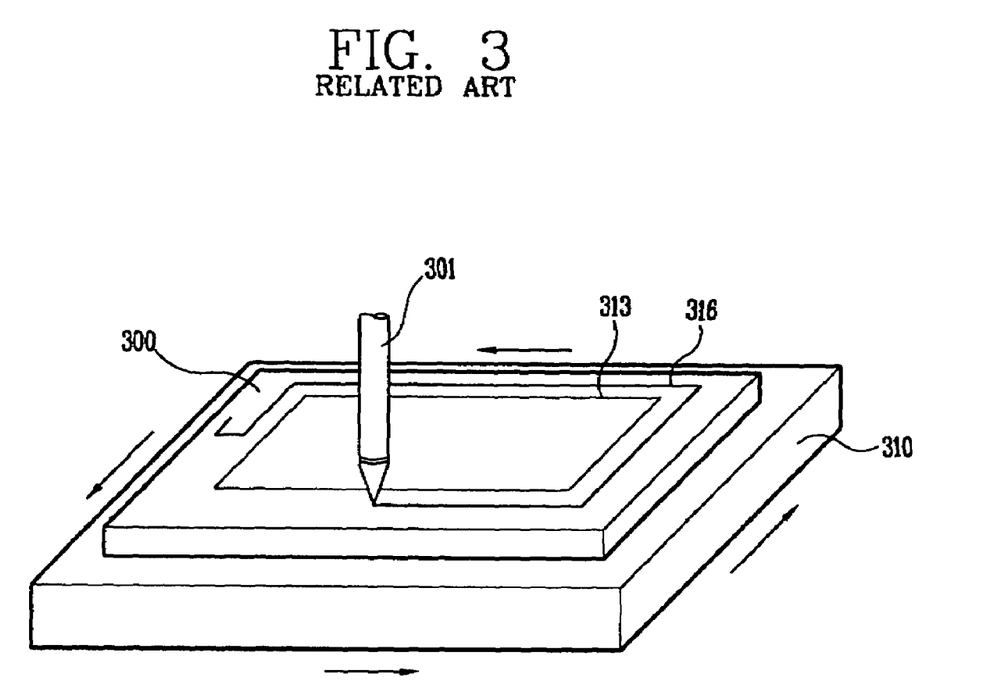
FIG. 3 illustrates formation of a seal pattern through a seal dispensing method in accordance with the related art.

To overcome the shortcomings of the screen printing method, a seal dispensing method has been proposed. FIG. 3 is an exemplary view of a related art dispensing method for forming a seal pattern. As shown in FIG. 3, while a table 310 with the substrate 300 loaded thereon is moved in forward/backward and left/right directions, a seal pattern 316 is formed along an outer edge of image display part 313 on the substrate 300 by applying a predetermined pressure to syringe 301 filled with a sealant. The seal pattern 316 is sequentially formed for the image display part 313.

In the seal dispensing method, since the sealant is selectively supplied to the region where the seal pattern 316 is to be formed, sealant waste is prevented. In addition, the syringe 301 does not contact the orientation film (not shown) of the image display part 313 of the substrate 300 so that the rubbed orientation film will not be damaged. Thus, picture quality of the liquid crystal display device will be maintained.

In the case of forming the seal pattern 316 on the substrate 300 by using the syringe 301, a technique for precisely controlling a gap distance between the substrate 300 and the syringe 301 is required. That is, if the substrate 300 and the syringe 301 are too close compared to a desired gap distance, the seal pattern 316 formed on the substrate 300 is wide and thin. If, however, the substrate 300 and the syringe 301 are separated too much compared to the desired gap distance, the seal pattern 316 formed on the substrate 300 becomes narrow and may become noncontiguous, which causes a defect in the liquid crystal display device.

If the sealant in the syringe 301 is completely used up while forming a seal pattern, the seal pattern 316 cannot be completely formed. Thus, a syringe 301 should be replaced with another syringe 301 filled with the sealant before it is completely used up. At this time, however, the gap distance between the substrate 300 and the syringe 301 varies depending on the syringe 301 in use. Thus, the gap distance between the substrate 300 and a syringe 301 should be reset and/or checked every time a syringe 301 is replaced with a new syringe. Replacement of the syringe 301 is frequently done during actual manufacturing of products. Therefore, a technique for setting or checking the gap distance between the substrate 300 and the syringe 301 within a short time is preferable.

Figure 4:
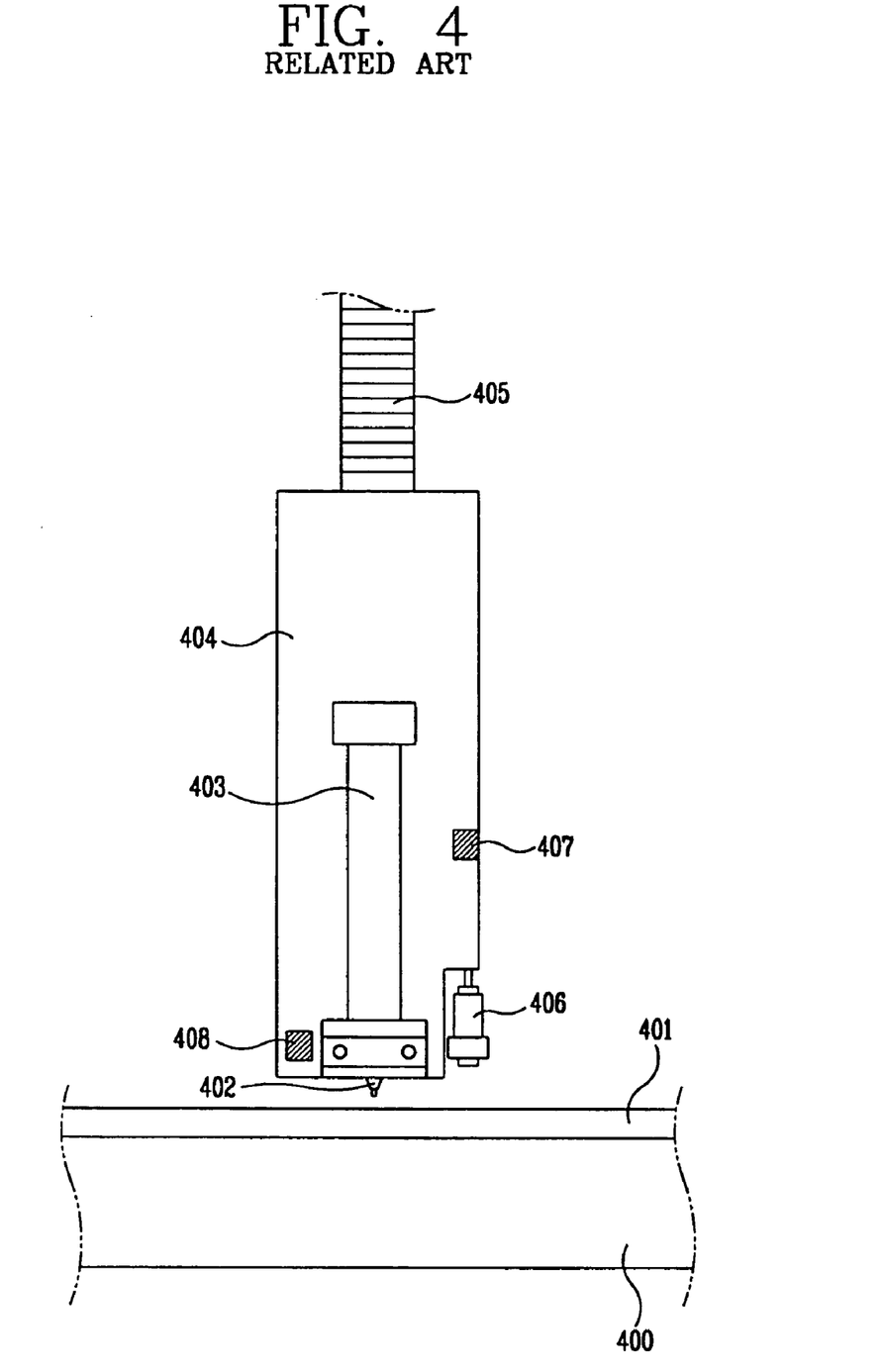
FIG. 4 illustrates a seal dispenser of a liquid crystal display panel in accordance with the related art.

In the related art, a manual operation method has been adopted to control the gap distance between the substrate 300 and the syringe 301, which will now be described in detail. FIG. 4 is an exemplary view showing a seal dispenser of a liquid crystal display panel in accordance with the related art. As shown in FIG. 4, a seal dispenser includes a syringe 403 with a nozzle 402 at one end thereof for supplying a sealant onto a substrate 401 that is loaded onto a table 400, a body 404 for mounting the syringe 403 above the substrate 401, a vertical driving servo motor 405 for moving the body 404 in a vertical direction; a microgauge 406 for turning the vertical driving servo motor 405 via manual operation, a first sensor 407 for detecting whether the substrate 401 and the nozzle 402 are in contact with each other; and a second sensor 408 for detecting a gap distance between the substrate 401 and the nozzle 402.

Figure 5:
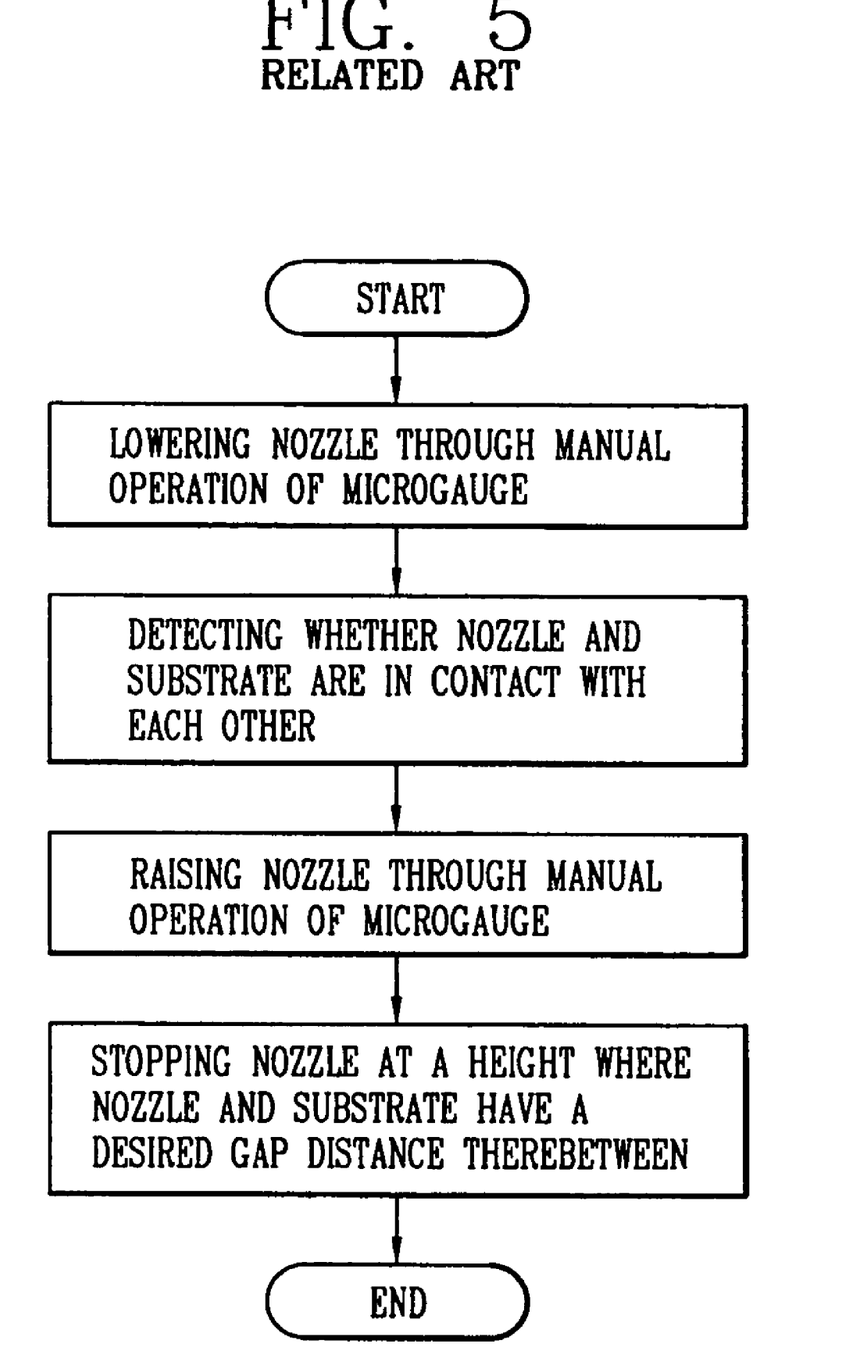
FIG. 5 is a flow chart of a method according to the related art for controlling a gap distance between a nozzle and a substrate using the seal dispenser of FIG. 4.

FIG. 5 is a flow chart of a method according to the related art for controlling a gap distance between the nozzle and the substrate by using the seal dispenser of the liquid crystal display panel. As shown in FIG. 5, the method according to the related art for controlling a gap distance between the nozzle and the substrate by using the seal dispenser of the liquid crystal display panel includes lowering the nozzle 402 by manually manipulating the microgauge 406; detecting whether the nozzle 402 and the substrate 401 are in contact with each other; raising the nozzle 402 by manually manipulating the microgauge 406; and stopping the nozzle at the gap distance between the nozzle 402 and the substrate 401.

The related art of the seal dispenser of the liquid crystal display panel and the method for controlling a gap distance between the nozzle and the substrate using the dispenser will now be described in more detail. First, when the substrate 401 is loaded on the table 400, a user turns the vertical driving servo motor 405 by manually manipulating the microgauge 406 to thereby lower the syringe 403 mounted in the body 404. At this time, the user detects whether the nozzle 402 provided at an end portion of the syringe 403 and the substrate 401 loaded on the table 400 are in contact with each other through monitoring of a value measured by the first sensor 407.

When the substrate 401 and the nozzle 402 are detected to be in contact with each other by the first sensor 407, the user turns the vertical driving servo motor 405 by manually manipulating the microgauge 406, thereby raising the syringe 403 mounted in the body 404. At this time, the user detects whether the gap distance between the substrate 401 and the nozzle 402 reaches a desired value through monitoring of a value measured by the second sensor 408 and stops manipulating the microgauge 406 when the value measured by the second sensor 408 reaches a desired value.

The related art of the seal dispenser of the liquid crystal display panel and the method for controlling a gap distance between the nozzle and the substrate have the following problems. First, since the user controls the gap distance between the substrate 401 and the nozzle 402 by manually manipulating the microgauge 406, reliability and consistency are low, which increases the defective occurrence rate in the manufactured liquid crystal display panels. In addition, even a skilled user requires a lot of time to set the gap distance between the substrate 401 and the nozzle 402 precisely, which degrades productivity. Furthermore, since the gap distance is set by the user's manual operation, a strong and constant concentration, which quickly tires users, is required for users to maintain a good process pace.

SUMMARY OF THE INVENTION

Accordingly, the present invention is directed to a dispenser for a liquid crystal display panel and method for controlling gap between substrate and nozzle using the same that substantially obviates one or more of the problems due to limitations and disadvantages of the related art.

An object of the present invention is to provide a dispenser for a liquid crystal display panel and a method for controlling a gap distance between a nozzle and a substrate using the same that are capable of automatically controlling a gap distance between a nozzle provided at a dispenser and a substrate.

To achieve these and other advantages and in accordance with the purpose of the present invention, as embodied and broadly described herein, there is provided a dispenser for a liquid crystal display panel including: a syringe having a nozzle provided at an end thereof; a body in which the syringe is mounted; a vertical driving stepping motor for moving the body in a vertical direction; a first sensor for detecting whether the nozzle of the syringe is in contact with a substrate, a second sensor for detecting a gap distance between the nozzle and the substrate; and a main unit for controlling the vertical driving stepping motor in response to an output from the second sensor to obtain a desired gap distance between the nozzle and the substrate.

In another aspect, there is also provided a method for controlling a gap between a nozzle and a substrate using a dispenser for a liquid crystal display panel including: lowering a body with a syringe mounted therein using a vertical driving stepping motor; detecting whether a nozzle of the syringe is in contact with a substrate; raising the body; detecting a gap distance between the nozzle and the substrate; and controlling the vertical driving stepping motor so that a desired gap distance is obtained between the nozzle and the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 6:
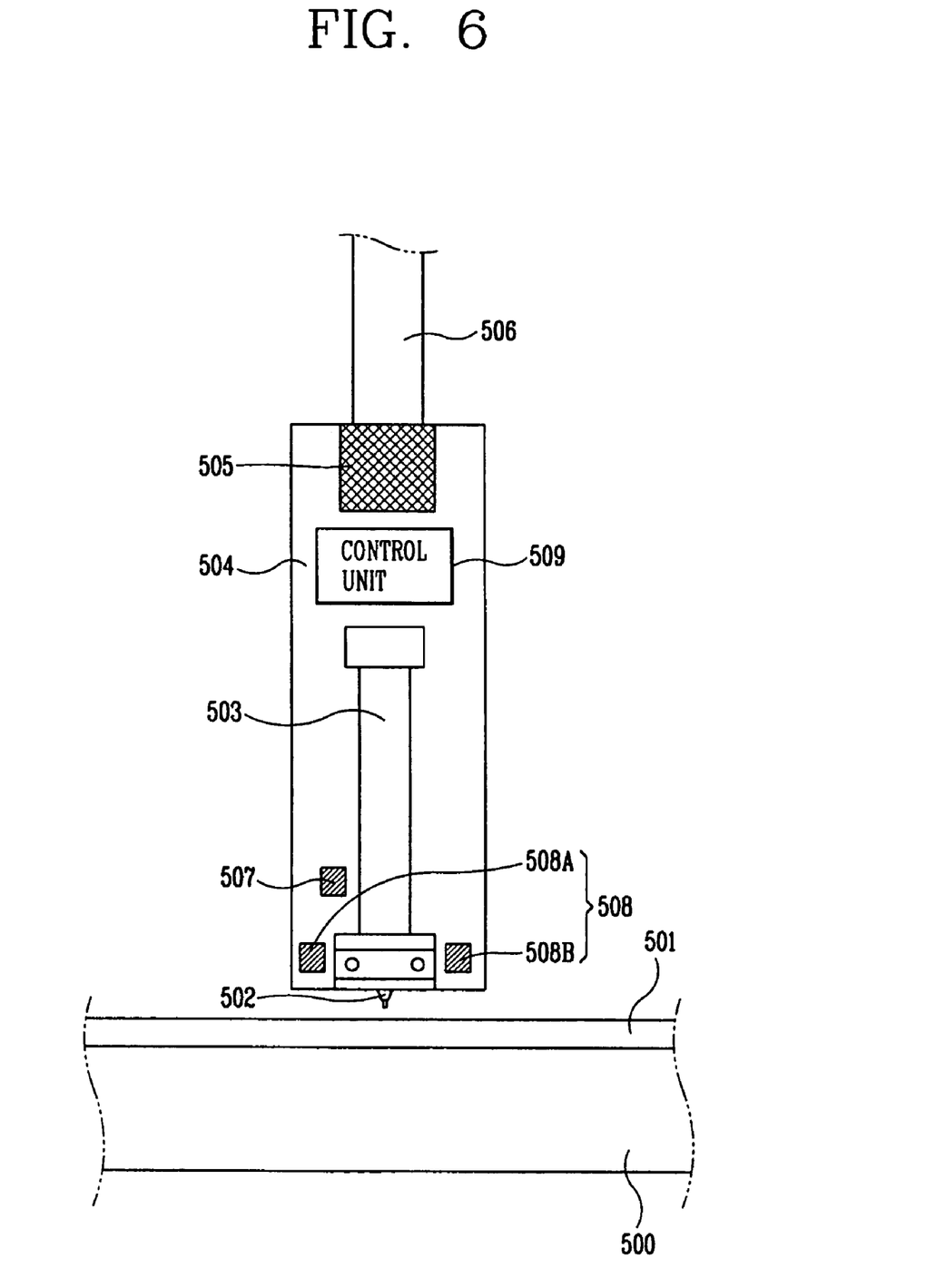
FIG. 6 illustrates a dispenser for a liquid crystal display panel in accordance with an embodiment of the present invention.

FIG. 6 illustrates a dispenser for a liquid crystal display panel in accordance with the present invention. As shown in FIG. 6, a dispenser for a liquid crystal display panel in accordance with the present invention includes a table 500 for supporting a substrate 501, a syringe 503 with a nozzle 502 provided at an end portion thereof for supplying a sealant onto the substrate 501, a body 504 in which the syringe 503 is mounted, a vertical driving stepping motor 505 for moving the body 504 along a vertical shaft 506 in a vertical direction, a first sensor 507 for detecting whether the nozzle 502 of the syringe 503 is in contact with the substrate 501, a second sensor 508 for detecting a gap distance between the nozzle 502 and the substrate 501 and a control unit 509 for controlling the vertical driving stepping motor 505. The control unit 509 controls the vertical driving stepping motor 505 based upon signals from the first sensor 507 and the second sensor 508. The control unit 509 can be located in the body 504, on an external surface of the body 504, integrated into one of the sensors, integrated into both of the sensors or at a location completely separate from the body 504.

Figure 7:
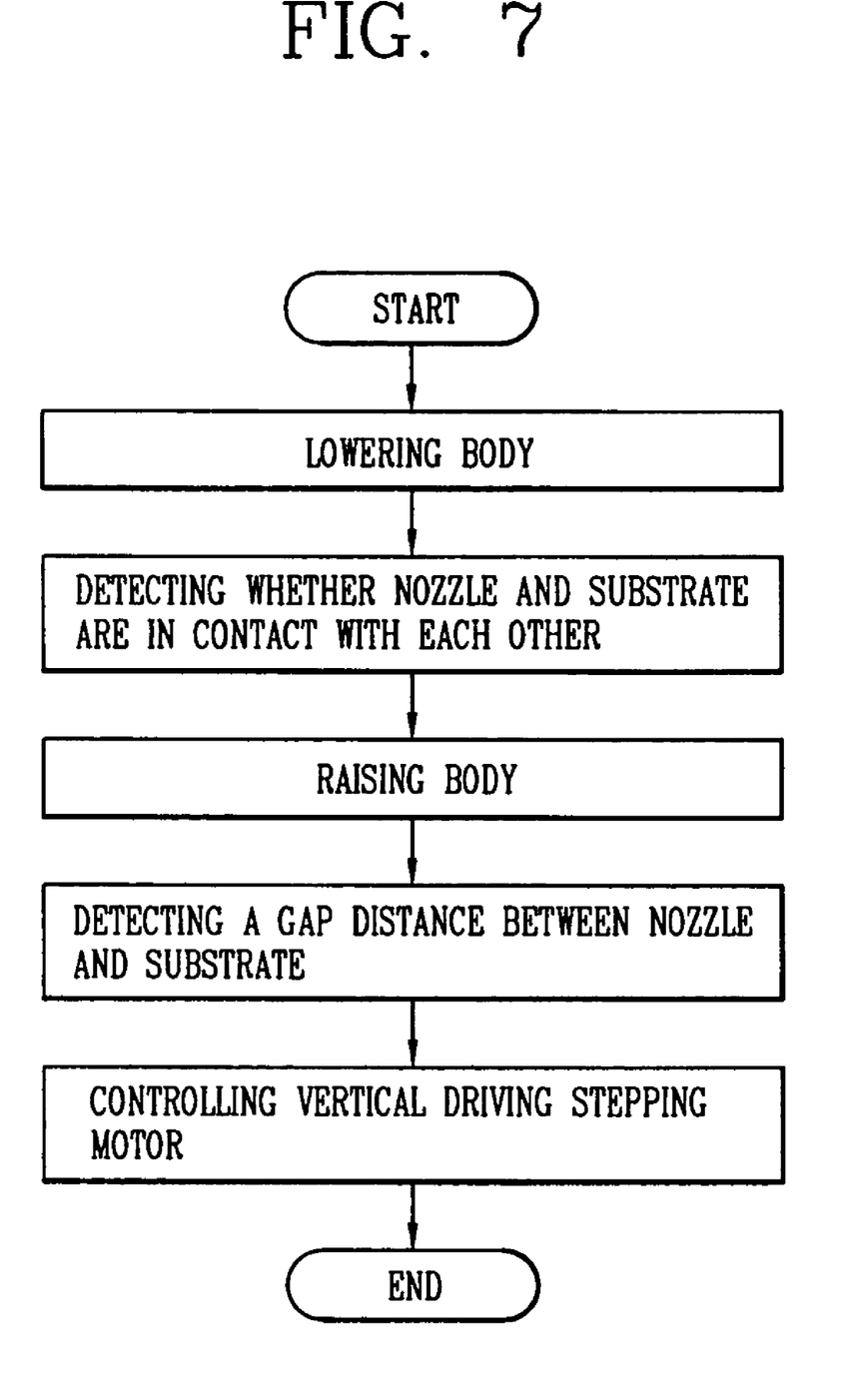
FIG. 7 is a flow chart of a method in accordance with an embodiment of the present invention for controlling a gap distance between a nozzle and a substrate using the dispenser of FIG. 6.

FIG. 7 is a flow chart of a method in accordance with an embodiment of the present invention for controlling a gap distance between a nozzle and a substrate using the dispenser of FIG. 6. As shown in FIG. 7, a method for controlling a gap distance between a nozzle and a substrate using the dispenser includes lowering the body 504 having the syringe 503 mounted therein using the vertical driving stepping motor 505; detecting whether the nozzle 502 of the syringe 503 is in contact with the substrate 501; raising body 504; detecting a gap distance between the nozzle 502 and the substrate 501; and controlling the vertical driving stepping motor 505 so that the gap distance between the nozzle 502 and the substrate 501 obtains a desired gap distance.

The dispenser for a liquid crystal display panel and the method for controlling a gap distance between the nozzle and the substrate using the dispenser will now be described in detail. First, the substrate 501 is loaded onto the table 500. The vertical driving stepping motor 505 is then driven to lower the body 504 having the syringe 503 mounted therein. After the body 504 is lowered, the first sensor 507 is used to detect whether the nozzle 502 provided at an end portion of the syringe 503 is in contact with the substrate 501.

If the table 500 is metallic, a magnetic sensor, for example, can be used as the first sensor 507. The magnetic sensor in the body 504 sends a signal to the control unit 509 that changes as the body 504 is lowered by the vertical driving stepping motor 505 toward the table 500. When the nozzle 502 is in contact with the substrate 501, the lowering of the body 504 stops so that the electric signal stops changing. The control unit 509 recognizes an absence of change in the electric signal as the nozzle 502 being in contact with the substrate 501. When the control unit 509 recognizes that lowering of the body 504 has stopped, the control unit 509 stops the vertical driving stepping motor 505.

After the control unit 509 has controlled the vertical driving stepping motor 505 to stop the lowering of the body 504, the control unit 509 controls the vertical driving stepping motor 505 to raise the body 504. A second sensor 508 is used to detect the gap distance between the nozzle 502 and the substrate 501. Based upon an output from the second sensor 508, the control unit 509 controls the vertical driving stepping motor 505 to raise the body 504 so that a desired gap distance can be obtained between the nozzle 502 and the substrate 501. Subsequently, the control unit 509 controls the vertical driving stepping motor 505 to raise and lower the body 504 so that a desired gap distance, can be maintained between the nozzle 502 and the substrate 501. A laser displacement sensor, which has an accuracy, for example, of ±200 μm can be adopted as the second sensor 508.

Figure 8:
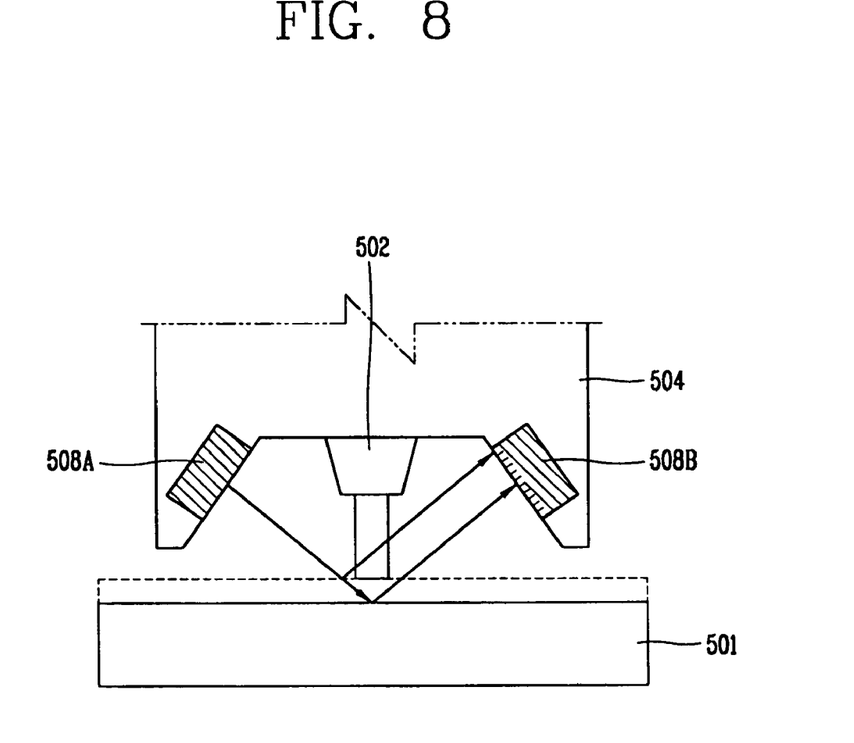
FIG. 8 shows a detailed construction of a second sensor in FIG. 6.

FIG. 8 shows a detailed construction of a second sensor of FIG. 6 in accordance with an embodiment of the present invention. As shown in FIG. 8, the laser displacement sensor is provided near the nozzle 502 of the body 504, and includes a light emitting unit 508A irradiating laser on the surface of the substrate 501 and a light receiving unit 508B on which the laser irradiated from the light emitting unit 508A is incident after being reflected from the substrate 501. The light receiving unit 508B is constructed to detect a gap distance between the nozzle 502 and the substrate 501 according to a position on the surface of the light receiving unit 508B at which the laser is incident. For example, if the gap distance between the nozzle 502 and the substrate 501 is to be about as 40 μm, the light receiving unit 508B is set such that the laser reflected from the substrate 501 is made incident at the center of the light receiving unit 508B. Accordingly, when the nozzle 502 is too close to the substrate 501, the laser reflected from the substrate 501 is made incident at an upper end of the light receiving unit 508B. Then, the vertical driving stepping motor 505 is controlled by the control unit 509 to raise the body 504 so that the laser reflected from the substrate 501 may be made incident at the center of the light receiving unit 508B. On the other hand, if the nozzle 502 is too far away from the substrate 501 so as to cause the laser reflected from the substrate 501 to be incident at a lower end of the light receiving unit 508B, the control unit 509 lowers the body 504 so that the laser reflected from the substrate 501 may be made incident at the center of the light receiving unit 508B. Thus, the gap distance between the nozzle 502 and the substrate 501 can be consistently set and maintained at about 40 μm.

After the gap distance between the substrate 501 and the nozzle 502 is controlled to be at a desired gap, either the table 500, on which the substrate 501 has been loaded, or the body 504, in which the syringe 503 mounted therein, is horizontally moved to change position while the sealant is being applied to the substrate 501 to form a seal pattern on the substrate 501. In the case that the body 504 having the syringe 503 mounted therein is moved, a foreign material may be generated due to the movement of the dispenser that can be adsorbed into the substrate 501. Thus, the table 500 with the substrate 501 loaded thereon may be moved in forward/backward and left/right directions to form the seal pattern. The control unit 509 can maintain the desired gap distance as the table is moved base upon an output from the second sensor 508.

According to the dispenser for a liquid crystal display panel and the method for controlling the gap between the nozzle and the substrate in accordance with the present invention, the laser is irradiated for reception by the second sensor while the seal pattern is being formed by horizontally moving the table 500 with the substrate 501 loaded thereon in the forward/backward and left/right directions. Thus, the gap distance between the nozzle 502 and the substrate 501 can be controlled or maintained on a real time basis. Even if there is a small uneven portion in the surface of the substrate 501, the seal pattern can still be formed with a uniform height and width because of the real time control of the gap distance between the nozzle 502 and the substrate 501.

The method for controlling a gap distance between the substrate and the nozzle in accordance with the present invention is started with a driving instruction being input from a user through an input unit such as a touch panel or a keyboard. In the alternative, the process can start when a substrate is detected via other types of input devices. The vertical driving stepping motor 505 automatically lowers the body 504 after the input is received. Then, the contact of the nozzle 502 to the substrate 501 is detected by the first sensor 507. The body 504 is raised by the vertical driving stepping motor 505 and is controlled to be maintained at a predetermined distance from the substrate 501 based upon an output from the second sensor 508 such that the gap distance between the substrate 501 and the nozzle 502 is consistently and/or constantly controlled to be at a desired gap distance.

Degradation of picture quality and yield of the liquid crystal display panel due to a defective seal pattern can be prevented by using the dispenser for a liquid crystal display panel and the method for controlling a gap distance between the substrate and the nozzle in accordance with the present invention. In addition, even an unskilled user can precisely set and control the gap distance between the substrate 501 and the nozzle 502 in a short time period so that productivity is improved.

The shape of the seal pattern formed according to the present invention may be varied depending on the method of forming a liquid crystal layer. The method for forming the liquid crystal layer may be divided into a vacuum injection method and a dropping method, which will now be described in detail. First, the vacuum injection method begins with a unit liquid crystal display panel having a liquid crystal injection opening being separated from a large-scale mother substrate and positioned in a container filled with liquid crystal in a vacuum chamber. Then, liquid crystal is injected into the liquid crystal display panel according to a pressure difference between an inner side and an outer side of the liquid crystal display panel by varying a vacuum degree. After the liquid crystal is filled into the liquid crystal display panel, the liquid crystal injection opening is sealed to form the liquid crystal layer of the liquid crystal display panel. The liquid crystal injection opening in the vacuum injection method is defined as a region opened at each side of the seal patterns. Thus, in the case of forming a liquid crystal layer at the liquid crystal display panel through the vacuum injection method, the seal patterns are formed with each opened portion to function as a liquid crystal injection opening.

The vacuum injection method has the following problems. First, it takes a long time to fill liquid crystal into the liquid crystal display panel using the vacuum injection method. In general, the attached liquid crystal display panel with an area of several hundreds $cm^2$ has only a gap of a few μm. Thus, even with the vacuum injection method, which uses the pressure difference, the injection quantity of liquid crystal by unit time is naturally quite small. For instance, in the case of fabricating a liquid crystal display panel of about 15 inches, 8 hours are required to fill it with liquid crystal. Such a long time taken for fabrication of the liquid crystal display panel degrades productivity. As the size of liquid crystal display panel increase, the time required for filling liquid increases such that productivity further degrades. Therefore, the vacuum injection method does not readily cope with the fabrication of large-scale liquid crystal display panels.

Second, a lot of liquid crystal is consumed using the vacuum injection method. In general, the actual injected quantity of liquid crystal is very small compared to the amount of liquid crystal filled into the container. Liquid crystal degrades when exposed to air or to a specific gas. Thus, a large amount of liquid crystal remaining after filling has to be discarded, which increases the unit price of the liquid crystal display device so that price competitiveness of the product is weakened.

In order to overcome such problems of the vacuum injection method, the dropping method has been recently adopted. The dropping method is when liquid crystal is dispensed by dropping onto one of a large-scale mother substrate on which a plurality of thin film transistor array substrates are fabricated or onto another large-scale mother substrate on which color filter substrates is fabricated, and then the two mother substrates are attached to each other so that liquid crystal is uniformly distributed at the entire image display regions by the attaching pressure so as to form the liquid crystal layer. Unlike the vacuum injection method, the dropping method then proceeds with attaching the two mother substrates and separating unit liquid crystal display panels from the attached two mother substrates after the liquid crystal layer is formed.

Because liquid crystal is dropped directly onto the substrate, rather than being filled from outside, the seal patterns are formed in a closed pattern encompassing each outer edge of the image display parts to prevent leakage of liquid crystal to the outside. By using the dropping method, liquid crystal may be dropped within a short time compared to the vacuum injection method, and even though the liquid crystal display panel is large in size, the liquid crystal layer may be formed quickly. Price competitiveness is strengthened because the unit price of the liquid crystal display panel decreases compared to using the vacuum injection method since only the required amount of liquid crystal is dropped onto the substrate and thus the high-priced liquid crystal is not discarded.

Unlike the vacuum injection method, the dropping method proceeds with separating the unit liquid crystal panels from the large-scale mother substrate after the liquid crystal layer is formed. In embodiments of the present invention as described above, the seal pattern is formed on the substrate 501 using a syringe 503 filled with the sealant. However, the dispenser for a liquid crystal display panel and the method for controlling the gap between the nozzle and the substrate in accordance with the present invention can be used for dropping liquid crystal on the substrate through the dropping method. As discussed above, the dispenser for the liquid crystal display panel in accordance with embodiments of the present invention maintains a gap distance between the nozzle 502 provided at an end of the syringe 503 and the substrate 501 is precisely controlled while dispensing material from the syringe 503. In the case of dispensing liquid crystal, the syringe 503 is filled with liquid crystal and a gap between the nozzle 502 and the substrate 501 is precisely controlled while the body 504 is repositioned to drop liquid crystal at predetermined positions on the substrate 501.

Figure 9:
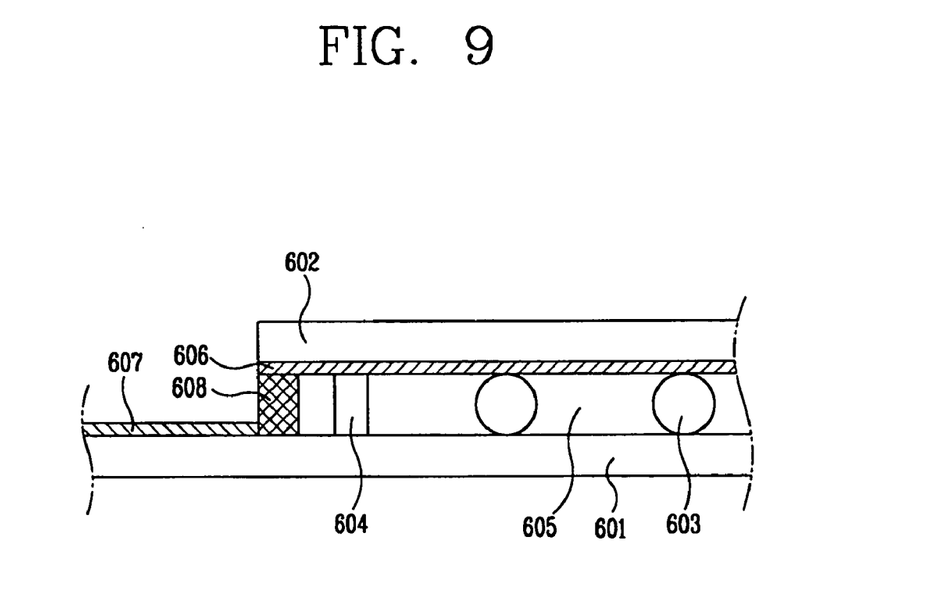
FIG. 9 is a schematic view showing a sectional structure of one edge of the liquid crystal display panel.

In addition, the dispenser for a liquid crystal display panel and the method of controlling a gap distance between a nozzle and a substrate in accordance with the present invention can also be used in the formation of a silver (Ag) dot during the fabrication of a liquid crystal display panel. The Ag dot will now be described in detail with reference to FIG. 9, which is a schematic view showing a sectional structure of one edge of the liquid crystal display panel. As shown in FIG. 9, a liquid crystal panel is formed such that a thin film transistor array substrate 601 and a color filter substrate 602 are attached in a facing manner with a certain gap distance maintained by a spacer 603 and a seal pattern 604. The liquid crystal layer 605 is formed in the gap distance between the thin film transistor array substrate 601 and the color filter substrate 602.

The thin film transistor array substrate 601 is formed with a protrusion and an image display part. In the protrusion part, a gate pad part connected to gate lines of the thin film transistor array substrate 601 and a data pad part connected to data lines of the thin film transistor array substrate 601 are formed. In the image display part of the thin film transistor array substrate 601, the gate lines to which a scan signal is applied through the gate pad part and the data lines to which image information is applied through the data pad part are arranged to cross each other, and a thin film transistor for switching the liquid crystal cells is formed at the crossing. Further, a pixel electrode connected to the thin film transistor is formed at the image display part of the thin film transistor array substrate 601.

In the image display part of the color filter substrate 602, there are provided color filters separately formed at the cell regions by a black matrix. A common transparent electrode for driving the liquid crystal layer together with the pixel electrode is also formed on the thin film transistor array substrate 601. A common voltage line 607 for applying a common voltage to the common electrode 606 on the color filter substrate 602 is formed on the thin film transistor array substrate 601. An Ag dot 608 is formed either on the thin film transistor array substrate 601 or the color filter substrate 602 to electrically connect the common voltage line 607 and the common electrode 606 so that the common voltage applied to the common voltage line 607 may be applied to the common electrode 606 by way of the Ag dot 608. At least one or more Ag dots 608 can be formed in each of the plurality of unit liquid crystal display panels fabricated on the large-scale mother substrate by using the dispenser for a liquid crystal display panel in accordance with embodiments of the present invention. More particularly, the syringe 503 (shown in FIG. 6) is filled with Ag and a gap between the nozzle 502 and the substrate 601 is precisely controlled while the body 504 is repositioned to deposit Ag dots at predetermined positions on the substrate 601.

As so far described, the dispenser for a liquid crystal display panel and the method for controlling a gap distance between the substrate and the nozzle using the dispenser in accordance with the present invention has several advantages. For example, the gap distance can be set automatically with little or no input from the user. Accordingly, reliability is much improved compared to manual operation such that degradation of picture quality and yield due to a defective seal pattern can be prevented. In addition, even an unskilled user can precisely control and set the gap distance between the substrate and the nozzle in a short time so that productivity can be remarkably improved. Further, the gap distance between the nozzle and the substrate may be controlled on a real time basis while the seal pattern is being formed. Therefore, even if there is a small unevenness in the surface of the substrate, the seal pattern may be formed with a uniform height and width. Moreover, the time, effort and expense for dropping liquid crystal or forming Ag dots can also be reduced because liquid crystal or Ag, as well as the sealant, can be filled into the syringe within the body and dispensed.

It will be apparent to those skilled in the art that various modifications and variations can be made in the dispenser for liquid crystal display panel and method for controlling gap between substrate and nozzle using the same of the present invention without departing from the spirit or scope of the inventions. Thus, it is intended that the present invention covers the modifications and variations of this invention provided they come within the scope of the appended claims and their equivalents.

What is claimed is:

1. A dispenser for a liquid crystal display panel, comprising:
   a table for mounting a substrate;
   a syringe having a nozzle provided at an end thereof;
   a body in which the syringe is mounted;
   a vertical driving stepping motor for moving the body in a vertical direction;
   a first sensor in the body for detecting whether the nozzle of the syringe is in contact with the substrate after the body is lowered;
   a second sensor for detecting a gap distance between the nozzle and the substrate; and
   a main unit for controlling the vertical driving stepping motor in response to an output from the second sensor to obtain a desired gap distance between the nozzle and the substrate,
   wherein the first sensor includes magnetic sensor sending an electric signal to the main unit that changes as the body is lowered by the vertical driving stepping motor toward the table,
   wherein when the nozzle is in contact with the substrate, the lowering of the body stops so that the electrical signal stops changing and
   wherein the main unit recognizes an absence of change in the electrical signal as the nozzle is in contact with the substrate and
   controls the vertical driving stepping motor to stop the lowering of the body, to raise the body so that a desired gap distance can be obtained between the nozzle and the substrate based upon an output from the second sensor, and to raise and lower the body so that a desired gap can be maintained between the nozzle and the substrate.

2. The dispenser of claim 1, wherein the second sensor is a laser displacement sensor.

3. The dispenser of claim 1, wherein the table is horizontally movable in forward/backward and left/right directions.

4. The dispenser of claim 1, wherein the second sensor comprises:
   a light emitting unit for irradiating laser on the surface of the substrate; and
   a light receiving unit for receiving laser reflected from the substrate.

5. The dispenser of claim 4, wherein the light receiving unit detects a gap distance between the nozzle and the substrate according to a position on a surface of the light receiving unit.

6. The dispenser of claim 1, wherein the syringe is filled with sealant.

7. The dispenser of claim 1, wherein the syringe is filled with liquid crystal.

8. The dispenser of claim 1, wherein the syringe is filled with Silver (Ag).

* * * * *